Aug. 21, 1962 R. F. WILLIAMS 3,050,189
FILTER
Filed March 18, 1959

Inventor
Roger F. Williams
by M. Talbert Dick
Attorney

Witness
Edward P. Seeley

United States Patent Office 3,050,189
Patented Aug. 21, 1962

3,050,189
FILTER
Roger F. Williams, 3420 SW. 9th, Des Moines, Iowa
Filed Mar. 18, 1959, Ser. No. 800,310
3 Claims. (Cl. 210—232)

This invention relates to fluid filters and more particularly to water filters.

The use of filters is old. In the matter of water filters, the usual structure usually consists of a container having a porous element through which the fluid to be filtered must pass. The device is threadably attached to an inlet pipe and threadably attached to an outlet pipe. Obviously the filter rapidly becomes fouled and ineffective. Two chief problems are involved, i.e., the services of a plumber is required to change the filter element and in the disassembling of the unit the water, sludge, foreign matter and like is spilled.

Therefore, one of the principal objects of my invention is to provide a filter device that permits the easy and quick change of its filter unit without the services of a skilled workman.

A further object of this invention is to provide a filter device that eliminates substantially all undesirable spilling of fluid and collected foreign matter.

A still further object of this invention is to provide a filter means that is highly efficient.

Still further objects of my invention are to provide a filter device that is economical in manufacture, durable in use and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Figure 1:
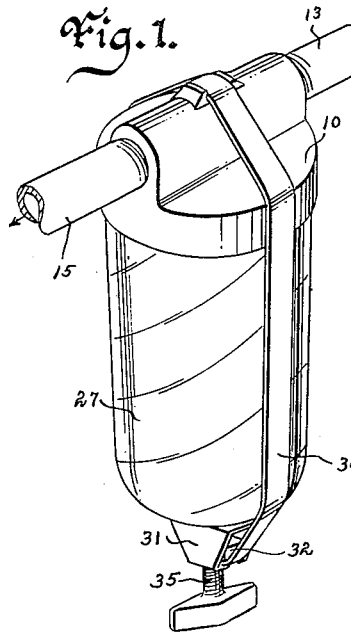
FIG. 1 is a perspective view of my device installed and in use.
Figure 2:
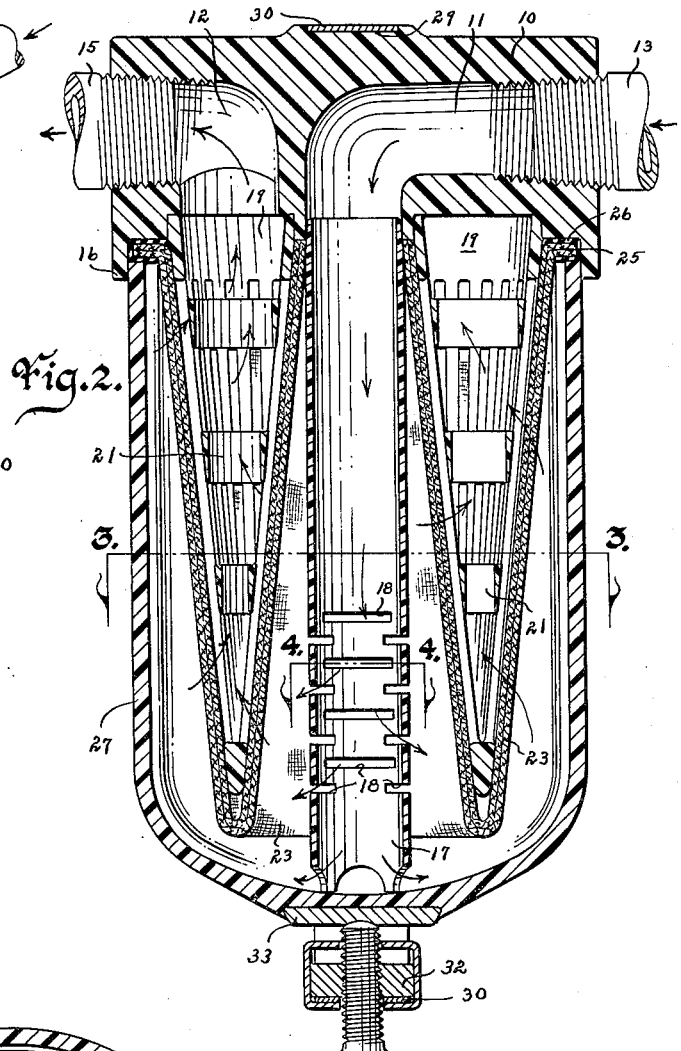
FIG. 2 is an enlarged vertical sectional view of my fluid filter.

In these drawings I have used the numeral 10 to designate the base head having a horizontal inlet passageway 11 communicating through the inside center bottom as shown in FIG. 2. The numeral 12 designates the horizontal outlet passageway in the base head communicating through the bottom of the base head at a point at the side of the bottom central area of the base head. In use the fluid inlet pipe 13 is threaded into the passageway 11, and the fluid outlet pipe 15 is threaded into the passageway 12. The base head 10 serves as the top cap of the container and when once secured to the pipes 13 and 15 is not removed therefrom.

Figure 3:
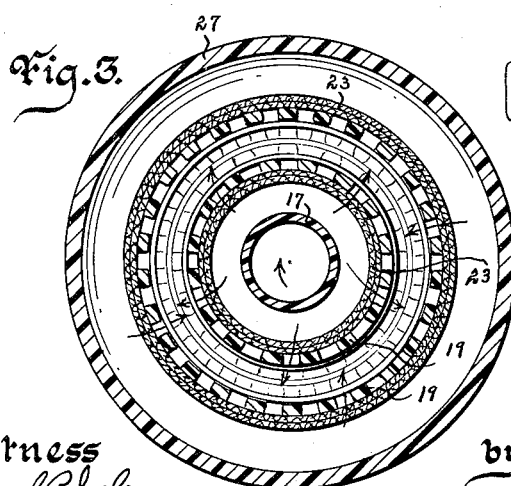
FIG. 3 is an enlarged cross-sectional view of the device taken on line 3—3 of FIG. 2 and more fully illustrates its construction.
Figure 4:
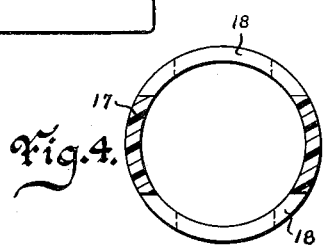
FIG. 4 is an enlarged cross-sectional view of the inlet core conduit and is taken on line 4—4 of FIG. 2.

The numeral 16 designates a downwardly extending continuous peripheral rim ring on the bottom of the base head. The numeral 17 designates the inlet core conduit which is in the form of a vertical pipe length and has its upper end tapered to detachably extend into and wedge in the discharge end of the passageway 11. This pipe 17 has an irregular open lower end and a series of slit openings 18 in the wall of its lower end portion as shown in FIG. 4. Also on the bottom of the base head and extending downwardly is a rigid frame housing 19. This frame housing means 19 is circular as shown in FIG. 3 and its side wall extends first downwardly and inwardly and then extends upwardly and inwardly. By this construction the capacity of the frame increases in area as it extends upwardly. The frame 19 has vertical slot openings in both its inner and outer walls and horizontal spaced apart strengthening rings 21 aid in giving it rigidity. The numeral 23 designates the filter element. This element is also circular and has its outer wall extending downwardly and inwardly and then it extends upwardly and inwardly to produce a detachable cover to conform to and embrace the outer and inner walls of the frame 19 as shown in FIG. 3. Any suitable material may be used for the disposable filter element such as porous paper material, cloth, felt, fabrics, woven metal and even spun glass fabric. The purpose obviously of the filter 23 is to strain the fluid passing through the device of undesirable particles. The filter may be of one, two or more thicknesses and has a continuous horizontal rim 25 adjacent the under side of the base head and inside the rim flange 16. The numeral 26 designates a flexible resilient sealing ring case embracing the rim 25. The numeral 27 designates a cup bowl detachably loosely embracing the filter element, the frame 19 and pipe 17. The upper rim of this cup bowl extends within the rim flange 16 and is adapted to engage the under side of the sealing ring case 26. The numeral 29 designates a groove in the top of the base head 10. The numeral 30 designates a belt extending vertically around the entire unit and engaging the groove 29. The numeral 31 designates a housing embracing the lower portion of the belt 30. This housing carries a nut 32. On the bottom of the cup bowl is a plate 33. The numeral 35 designates a wing screw, extending through the housing, threaded through the nut 32 and having its upper end engaging the plate 33. By tightening the screw, the belt and bottom of the cup bowl will be moved apart, thereby tightly elevating the cup bowl onto the sealing ring case thus hermetically sealing the unit and locking the filter into place in the unit. Flowable fluid will pass through the pipe 17 into the cup bowl. To reach the outlet passageway 12, the fluid must first pass through the filter element, thence through the openings in the frame, and thence from the inside of the frame (which communicates with the outlet passageway) into the outlet passageway. The filter element will strain undesirable matter such as dirt, sand, and like, from the flowable fluid, but obviously will eventually become fouled. It is a simple matter to loosen the screw and thereby permit the belt to be moved from under the cup bowl. With the belt no longer holding the cup bowl, it may be removed with its dirty liquid contents and then cleaned for replacement. With the water or like shut off, there is very little muss experienced in this operation. If the filter element is no longer serviceable, it is discarded and replaced with a new one. The device is then reassembled and again ready for efficient use. By the arrangement of parts and the openings in the core pipe 17 being in the lower area of the pipe, fluid passing through the device first flows downwardly and then upwardly. This reversal of direction of flow also aids in depositing foreign matter in the bottom of the cup bowl. For the purposes of economy and light weight, I recommend that the base head, frame unit 19, pipe 17, and cup bowl be of plastic material.

As herebefore indicated, the tube pipe 17 is of plastic and because of this and the horizontal openings 18 this member 17 does have resilient flexible characteristics longitudinally of its axis and serves an additional purpose than that of passing the liquid to the inside lower portion of the bowl. By the upper end portion of the member 17 being tapered inwardly as shown in the drawings, it not only wedges into position but also wedges the upper inner circular portion of the filter on to and against the upper portion of the element 19 as shown in FIG. 2. This wedging action not only centers but also aids in holding the filter in proper position. The length of the member 17 is such that its longitudinal resiliency is employed in this operation of assembly. The bowl, filter and tube pipe 17, when installed, are moved upwardly as a unit on to the base 10 and the longitudinal spring action of the pipe tube 17 is to yieldingly resiliently wedge into the filter 23 and also into the passageway 11. This longitudinal resilient spring action of pipe tube 17 will continue thus continuously maintaining the proper position of the various parts of the device.

Some changes may be made in the construction and arrangement of my filter without departing from the real spirit and purpose of my invention, and it is my intention to cover by my claims, any modified forms of structure or use of mechanical equivalents which may be reasonably included within their scope.

I claim:

1. A fluid filter device comprising a base head having a fluid inlet passageway communicating with its center underside and a fluid outlet passageway communicating with its underside at an area one side of its center area, a cup bowl adapted to be detachably secured to the underside of said base head, means for detachably securing said cup bowl to said base head, a longitudinally resilient vertical tubular core member designed in such manner that liquid flows freely therethrough and outwardly thereof, having its upper end communicating with the inlet passageway of said base head and its lower end making contact with the inner surface of said cup bowl, said vertical core member being held in communication with said inlet by the upward thrust of said cup bowl when the fluid filter is in operative condition, an open frame housing secured to the underside of said base head, the interior of said open frame housing communicating with said outlet passageway, and a filter element substantially conforming to the shape of and embracing said frame housing having an annular outer top edge secured between the upper edge of said cup bowl and said base head and an annular inner top edge wedgingly secured between said vertical core member and said frame housing when said fluid filter is in operative condition.

2. A fluid filter comprising a base head having a fluid inlet passageway communicating with its center underside and a fluid outlet passageway communicating with its underside at an area one side of its center area, a cup bowl adapted to be detachably secured to the underside of said base head, means for detachably securing said cup bowl to said base head, a longitudinally resilient vertical pipe member having a tapered upper end for wedging engagement with said inlet passageway and a plurality of openings in said pipe member for the flow of liquid therethrough, the lower end of said pipe making contact with the inner surface of said cup bowl and being held in communicating relationship with said inlet by the upward thrust of said cup bowl when said cup bowl is secured to said base head, an open frame housing secured to the underside of said base head, the interior of said open frame housing communicating with said outlet passageway and a filter element substantially conforming to the shape of and embracing said frame housing having an annular outer top edge secured between the upper edge of said cup bowl and said base head and an annular inner top edge wedgingly secured between said vertical pipe and said frame housing when said fluid filter is in operative condition.

3. A fluid filter device comprising a base head having a fluid inlet passageway communicating with its center underside and a fluid outlet passageway communicating with its underside at an area one side of its center area, a cup bowl adapted to be detachably secured to the underside of said base head, means for detachably securing said cup bowl to said base head, a longitudinally resilient vertical tubular core member having a tapered upper end for wedging engagement with said inlet passageway and a plurality of openings in said core member for the flow of liquid therethrough, the lower end of said core making contact with the inner surface of said cup bowl and being held in communicating relationship with said inlet by the upward thrust of said cup bowl when said cup bowl is secured to said base head, an open frame housing having its upper portion secured to the underside of said base head and its interior communicating with the outlet passageway of said base head, said frame housing having a wall that extends first downwardly and outwardly and then upwardly and outwardly, and a filter element substantially conforming to the shape of and embracing said frame housing having an annular outer top edge secured between the upper edge of said cup bowl and said base head and an annular inner top edge wedgingly secured between said vertical core member and said frame housing when said fluid filter is in operative condition.

References Cited in the file of this patent

UNITED STATES PATENTS

| | | |
|---|---|---|
| 1,639,170 | Fell | Aug. 16, 1927 |
| 1,647,799 | Hammer | Nov. 1, 1927 |
| 1,671,606 | Pierce | May 29, 1928 |
| 2,326,691 | Schum | Aug. 10, 1943 |
| 2,503,566 | Scott | Apr. 11, 1950 |
| 2,863,559 | Schulze | Dec. 9, 1958 |
| 2,973,097 | Snider | Feb. 28, 1961 |

FOREIGN PATENTS

| | | |
|---|---|---|
| 426,315 | Germany | Mar. 6, 1926 |
| 145,990 | Austria | May 25, 1936 |
| 547,062 | Canada | Oct. 1, 1957 |